(12) United States Patent
Shirani-Mehr et al.

(10) Patent No.: US 11,996,702 B2
(45) Date of Patent: May 28, 2024

(54) RESONATOR CONTROL TECHNIQUES FOR WIRELESS POWER TRANSMITTING UNITS

(71) Applicant: Intel Corporation, Santa Clara, CA (US)

(72) Inventors: Hooman Shirani-Mehr, Portland, OR (US); Ahmad Khoshnevis, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 6 days.

(21) Appl. No.: 15/760,138

(22) PCT Filed: Jul. 1, 2016

(86) PCT No.: PCT/US2016/040811
§ 371 (c)(1),
(2) Date: Mar. 14, 2018

(87) PCT Pub. No.: WO2017/065851
PCT Pub. Date: Apr. 20, 2017

(65) Prior Publication Data
US 2018/0248407 A1    Aug. 30, 2018

Related U.S. Application Data

(60) Provisional application No. 62/241,591, filed on Oct. 14, 2015.

(51) Int. Cl.
*H02J 50/12* (2016.01)
*H02J 50/20* (2016.01)
*H02J 50/40* (2016.01)

(52) U.S. Cl.
CPC .............. *H02J 50/12* (2016.02); *H02J 50/20* (2016.02); *H02J 50/40* (2016.02)

(58) Field of Classification Search
None
See application file for complete search history.

(56) References Cited

U.S. PATENT DOCUMENTS

2012/0062039 A1*  3/2012  Kamata ................... H02J 50/80
                                                                  307/104
2013/0057078 A1   3/2013  Lee et al.
(Continued)

FOREIGN PATENT DOCUMENTS

CN    102144239 A    8/2011
CN    102439820 A    5/2012
(Continued)

OTHER PUBLICATIONS

International Search Report received for PCT Patent Application No. PCT/US2016/040811, dated Nov. 18, 2016, 3 pages.

*Primary Examiner* — Daniel Kessie
(74) *Attorney, Agent, or Firm* — KDW Firm PLLC

(57) ABSTRACT

Resonator control techniques for wireless power transmitting units are described. One or more novel parameters may be defined for use in conjunction with dominant PRU selection on the part of a PTU. In various embodiments, each of a plurality of PRUs may determine values for one or more such parameters, and may report those values to the PTU. In some embodiments, the PTU may identify a parameter to be used as a selection criterion, and may identify the dominant PRU based on the respective values reported for that parameter by the plurality of PRUs. Other embodiments are described and claimed.

23 Claims, 9 Drawing Sheets

(56) References Cited

U.S. PATENT DOCUMENTS

| | | | |
|---|---|---|---|
| 2013/0082652 A1 | 4/2013 | Jung | |
| 2013/0278209 A1 | 10/2013 | Von Novak, III et al. | |
| 2014/0015330 A1* | 1/2014 | Byun | H02J 50/80 |
| | | | 307/104 |
| 2014/0327393 A1 | 11/2014 | Lee et al. | |
| 2016/0065005 A1* | 3/2016 | Won | H02J 50/20 |
| | | | 307/104 |
| 2016/0359375 A1* | 12/2016 | Lee | H02J 50/80 |
| 2017/0047788 A1* | 2/2017 | Xu | H02J 50/80 |
| 2018/0301934 A1* | 10/2018 | Prabhala | H02J 7/00714 |

FOREIGN PATENT DOCUMENTS

| | | |
|---|---|---|
| CN | 103748764 A | 4/2014 |
| KR | 1020130003965 A | 1/2013 |

* cited by examiner

FIG. 7

Storage Medium 700

Computer Executable Instructions for Operating as WCS 101 and/or PTU 102

Computer Executable Instructions for Operating as WCD 103/105/107 and/or PRU 104/106/108

RESONATOR CONTROL TECHNIQUES FOR WIRELESS POWER TRANSMITTING UNITS

RELATED CASE

This application is a national stage application claiming the benefit of and priority to International Application No. PCT/US2016/040811 entitled "RESONATOR CONTROL TECHNIQUES FOR WIRELESS POWER TRANSMITTING UNITS" filed Jul. 1, 2016, which claims priority to U.S. Provisional Patent Application No. 62/241,591, filed Oct. 14, 2015, both of which are incorporated herein by reference in their entirety.

TECHNICAL FIELD

Embodiments described herein generally relate to wireless power transfer systems.

BACKGROUND

In a wireless power transfer system, a power transmitting unit (PTU) may be capable of wirelessly transferring power to compatible devices that are located within a transfer field of that PTU. In order to effect power transfer, the PTU may apply current to a resonator coil, which may transfer power to one or more power receiving units (PRUs) via resonant inductive coupling with resonator coils of those PRUs. The current that it is desirable for the PTU to apply to the resonator coil during power transfer may depend on characteristics of the PRU(s) to which power is being transferred.

BRIEF DESCRIPTION OF THE DRAWINGS

FIG. 7 illustrates an embodiment of a second storage medium.

DETAILED DESCRIPTION

Figure 1:
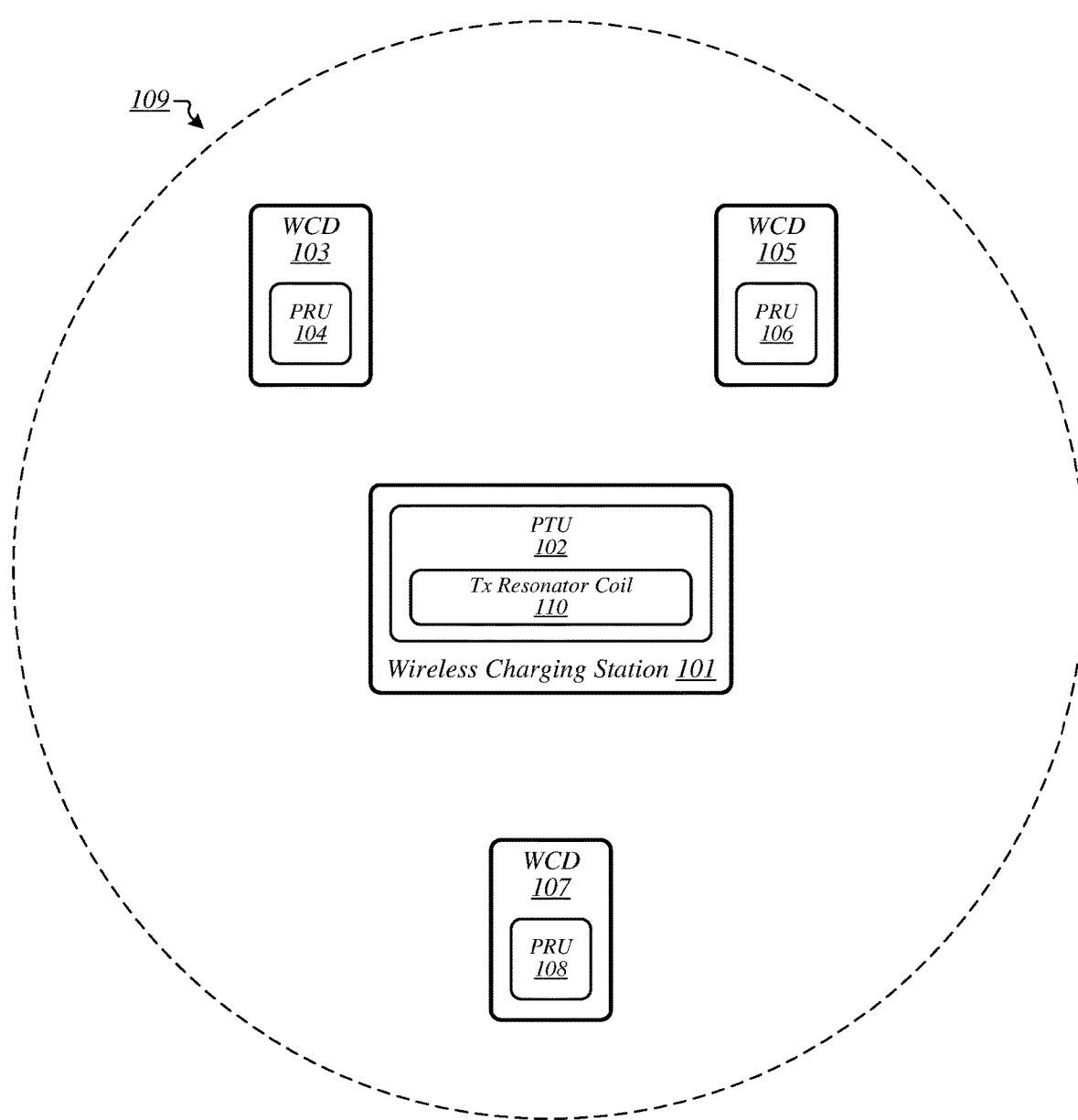
FIG. 1 illustrates an embodiment of a first operating environment.

Various embodiments may be generally directed to resonator control techniques for wireless power transmitting units. According to some such techniques, one or more novel parameters may be defined for use as criteria in conjunction with dominant PRU selection on the part of a PTU. In various embodiments, each of a plurality of PRUs may determine values for one or more such parameters, and may report those values to the PTU. In some embodiments, the PTU may identify a parameter to be used as a selection criterion, and may identify the dominant PRU based on the respective values reported for that parameter by the plurality of PRUs. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Embodiments herein are generally directed to wireless power transfer systems. Various embodiments may involve wireless power transfers performed according to one or more wireless power transfer standards. Wireless power transfer technologies and/or standards that may be used in some embodiments may include, for example, Rezence standards promulgated by the Alliance for Wireless Power, Qi standards promulgated by the Wireless Power Consortium, and the Power 2.0 standard promulgated by the Power Matters Alliance. Additional examples of wireless power transfer technologies and/or standards that may be used in some embodiments may include technologies and/or standards that may be promulgated by the organization formed by the 2015 merger of the Alliance for Wireless Power and the Power Matters Alliance. The embodiments are not limited to these examples.

Various embodiments may involve wireless communications performed according to one or more wireless communications standards. For example, some embodiments may involve wireless communications in Bluetooth Low Energy (also known as Bluetooth Smart) wireless networks according to Bluetooth Core Specification 4.2, released December 2014, and/or any predecessors, progeny, and/or variants thereof. Additional examples of wireless communications technologies and/or standards that may be used in various embodiments may include—without limitation—IEEE wireless communication standards such as the IEEE 802.11, IEEE 802.11a, IEEE 802.11b, IEEE 802.11g, IEEE 802.11n, IEEE 802.11u, IEEE 802.11ac, IEEE 802.11 ad, IEEE 802.11af, and/or IEEE 802.11ah standards, High-Efficiency Wi-Fi standards developed by the IEEE 802.11 High Efficiency WLAN (HEW) Study Group, Wi-Fi Alliance (WFA) wireless communication standards such as Wi-Fi, Wi-Fi Direct, Wi-Fi Direct Services, Wireless Gigabit ("WiGig"), WiGig Display Extension (WDE), WiGig Bus Extension (WBE), WiGig Serial Extension (WSE) standards and/or standards developed by the WFA Neighbor Awareness Networking (NAN) Task Group. Some embodiments may involve wireless communications performed according to one or more next-generation 60 GHz ("NG60") wireless local area network (WLAN) communications standards and/ or one or more millimeter-wave (mmWave) wireless communication standards.

Various embodiments may involve wireless communications performed according to one or more broadband wireless communications standards. For example, some embodiments may involve wireless communications performed according to one or more 3rd Generation Partnership Project (3GPP), 3GPP Long Term Evolution (LTE), and/or 3GPP LTE-Advanced (LTE-A) technologies and/or standards, including their predecessors, revisions, progeny, and/or variants. Additional examples of broadband wireless communication technologies/standards that may be utilized in various embodiments may include—without limitation—Global System for Mobile Communications (GSM)/Enhanced Data Rates for GSM Evolution (EDGE), Universal Mobile Telecommunications System (UMTS)/High Speed Packet Access (HSPA), and/or GSM with General Packet Radio Service (GPRS) system (GSM/GPRS), IEEE 802.16 wireless broadband standards such as IEEE 802.16m and/or IEEE 802.16p, International Mobile Telecommunications Advanced (IMT-ADV), Worldwide Interoperability for Microwave Access (WiMAX) and/or WiMAX II, Code Division Multiple Access (CDMA) 2000 (e.g., CDMA2000 1xRTT, CDMA2000 EV-DO, CDMA EV-DV, and so forth), High Performance Radio Metropolitan Area Network (HIPERMAN), Wireless Broadband (WiBro), High Speed Downlink Packet Access (HSDPA), High Speed Orthogonal Frequency-Division Multiplexing (OFDM) Packet Access (HSOPA), High-Speed Uplink Packet Access (HSUPA) technologies and/or standards, including their predecessors, revisions, progeny, and/or variants. Further examples of wireless communications technologies and/or standards that may be used in some embodiments may include—without limitation—machine-type communications (MTC) standards such as those embodied in 3GPP Technical Report (TR) 23.887, 3GPP Technical Specification (TS) 22.368, and/or 3GPP TS 23.682, and/or near-field communication (NFC) standards such as standards developed by the NFC Forum, including any predecessors, revisions, progeny, and/or variants of any of the above.

FIG. 1 illustrates an example of an operating environment 100 that may be representative of various embodiments. In operating environment 100, a wireless charging station 101 is configured with the ability to wirelessly transfer power to capable devices within a transfer region 109. It is worthy of note that the size and shape of transfer region 109—as well as its position and orientation relative to wireless charging station 101—may vary from embodiment to embodiment, and are not limited to the example depicted in FIG. 1. In this example, wireless charging station 101 provides power to wirelessly-chargeable devices (WCDs) 103, 105, and 107 that are located within transfer region 109. More particularly, wireless charging station 101 comprises a power transmitting unit (PTU) 102, which it uses to transfer power to respective power receiving units (PRUs) 104, 106, and 108 at WCDs 103, 105, and 107. PTU 102 may apply a current $I_{TX\_COIL}$ to a transmitting (Tx) resonator coil 110, which may enable wireless transfer of power to PRUs 104, 106, and 108 via resonant inductive coupling with receiving (Rx) resonator coils at PRUs 104, 106, and 108.

During power transfer operations, PTU 102 may select, adjust, and/or control $I_{TX\_COIL}$ according to one or more algorithms According to any particular such algorithm, $I_{TX\_COIL}$ may be selected, adjusted, and/or controlled based on characteristics of PRUs 104, 106, and 108 and/or characteristics associated with the wireless transfer of power to those PRUs. According to a first example algorithm, $I_{TX\_COIL}$ may be selected, adjusted, and/or controlled at PTU 102 in order to substantially maximize the overall wireless charging system efficiency η, which may be defined according to Equations (1) and (2) as follows:

$$\eta = \frac{\sum_{i=1}^{N} P_{RX\_REPORTED_i}}{P_{IN}} \quad (1)$$

$$P_{RX\_REPORTED_i} = V_{RECT\_REPORT_i} * I_{RECT\_REPORT_i} \quad (2)$$

where N represents the number of PRUs to which power is being transferred, $P_{IN}$ represents the DC power into PTU 102, $V_{RECT\_REPORT_i}$ represents the value reported by the $i^{th}$ PRU for the DC voltage at the output of the rectifier of that PRU, and $I_{RECT\_REPORT_i}$ represents the value reported by the $i^{th}$ PRU for the DC current out of the rectifier of that PRU.

According to some algorithms that may potentially be used in various embodiments, $I_{TX\_COIL}$ may be selected, adjusted, and/or controlled based on characteristics of a particular, "dominant" PRU and/or characteristics associated with the wireless transfer of power to that dominant PRU. Such algorithms may be referred to as "dominant PRU-based" algorithms According to an example dominant PRU-based algorithm, $I_{TX\_COIL}$ may be selected, adjusted, and/or controlled at PTU 102 in order to minimize a difference between the DC voltage $V_{RECT}$ at the output of the dominant PRU's rectifier and the dominant PRU's preferred value $V_{RECT\_SET}$ for $V_{RECT}$. The embodiments are not limited to this example.

In order to apply a dominant PRU-based algorithm, PTU 102 may first need to identify the dominant PRU. According to one approach, the dominant PRU may be defined as the PRU consuming the highest percentage of its rated output power. In some embodiments, the percentage ρ of its rated output power that a given PRU consumes may be determined according to Equations (3) and (4) as follows:

$$\rho = \frac{P_{RECT}}{P_{RECT\_MAX}} \quad (3)$$

$$P_{RECT} = V_{RECT} * I_{RECT} \quad (4)$$

where $P_{RECT}$ represents the average power out of the PRU's rectifier, $P_{RECT\_MAX}$ represents the maximum $P_{RECT}$ power for which the PRU is rated, $V_{RECT}$ represents the DC voltage at the output of the PRU's rectifier, and $I_{RECT}$ represents the DC current out of the PRU's rectifier.

In operating environment 100, identifying the dominant PRU as the PRU consuming the highest percentage of its rated output power may work well when PRUs 104, 106, and 108 have similar requirements/capabilities with respect to power, current, voltage, temperature, etc. For example, this approach may work well when PRUs 104, 106, and 108 are all PRUs of a same PRU category. However, if PRUs 104, 106, and 108 have dissimilar respective requirements/capabilities with respect to some or all of such parameters, PTU 102 may encounter difficulty in optimizing wireless power transfer in the system while observing the respective requirements/capabilities of the PRUs therein. For example, it may be difficult for PTU 102 to optimize wireless power transfer in the system if PRUs 104, 106, and 108 are PRUs of different respective PRU categories.

Disclosed herein are resonator control techniques for wireless power transmitting units that may be implemented in order to improve dominant PRU selection in various embodiments. According to some such techniques, one or more novel parameters may be defined for potential use as criteria in conjunction with dominant PRU selection on the part of a PTU. In various embodiments, each of a plurality of PRUs may determine values for one or more such parameters, and may report those values to the PTU. In some embodiments, the PTU may identify a parameter to be used as a selection criterion, and may identify the dominant PRU based on the respective values reported for that parameter by the plurality of PRUs. The embodiments are not limited in this context.

Figure 2:
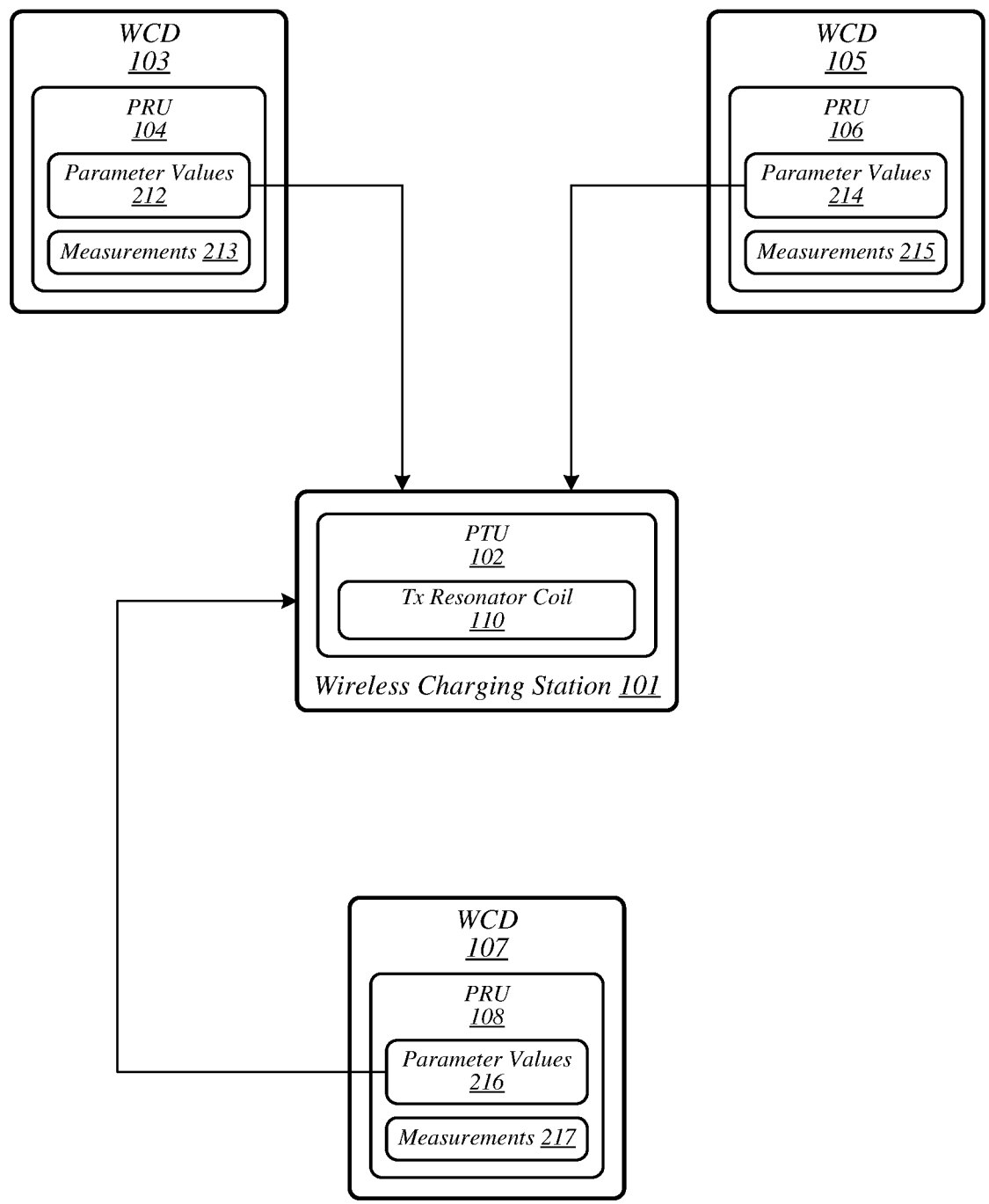
FIG. 2 illustrates an embodiment of a second operating environment.

FIG. 2 illustrates an example of an operating environment 200 that may be representative of the implementation of one or more of the disclosed resonator control techniques for wireless power transmitting units according to various embodiments. In operating environment 200, PRUs 104, 106, and 108 may determine respective parameter values 212, 214, and 216 for one or more parameters that may potentially be used at PTU 102 as dominant PRU selection criteria. In some embodiments, some or all of such parameter values may be determined based on measurements of various conditions at PRUs 104, 106, and 108, such as temperature measurements, current measurements, and voltage measurements, for example. In such embodiments, PRUs 104, 106, and 108 may determine respective measurements 213, 215, and 217 and may determine some or all of parameter values 212, 214, and 216 based on those measurements 213, 215, and 217. The embodiments are not limited in this context.

In various embodiments, after determining parameter values 212, 214, and 216, respectively, PRUs 104, 106, and 108 may transmit them to PTU 102. In some embodiments, PRUs 104, 106, and 108 may transmit parameter values 212, 214, and 216 to PTU 102 via Bluetooth Low Energy signaling. In various embodiments, PRUs 104, 106, and 108 may quantize some or all of parameter values 212, 214, and 216, and may transmit the quantized values to PTU 102. In some such embodiments, PRUs 104, 106, and 108 may quantize some or all of parameter values 212, 214, and 216 using quantization schemes/tables that are known both to PRUs 104, 106, and 108 and to PTU 102. In various embodiments, PTU 102 may identify a parameter to be used as a selection criterion, may identify the respective values reported for that parameter within the parameter values received from PRUs 104, 106, and 108, and may identify one of PRUs 104, 106, and 108 the dominant PRU based on those respective values. It is to be appreciated that although three PRUs are depicted in operating environment 200, the embodiments are not limited to this example, and greater and lesser number of PRUs are both possible and contemplated. The embodiments are not limited in this context.

In some embodiments, the parameter values to be reported to PTU 102 may include values of a temperature ratio parameter. In various embodiments, for a PRU i, the temperature ratio $\tau_i$ may be defined according to Equation (5) as follows:

$$\tau_i = \frac{t - T_{MIN}}{T_{MAX} - T_{MIN}} \qquad (5)$$

where t represents the temperature of PRU i, $T_{MIN}$ represents the minimum operating temperature for PRU i, and $T_{MAX}$ represents the maximum operating temperature for PRU i.

In some embodiments, the parameter values to be reported to PTU 102 may include values of a current ratio parameter. In various embodiments, for a PRU i, the current ratio $\sigma_i$ may be defined according to Equation (6) as follows:

$$\sigma_i = \frac{I_{RECT}}{I_{RECT\_MAX}} \qquad (6)$$

where $I_{RECT}$ represents the DC current out of the rectifier of PRU i and $I_{RECT\_MAX}$ represents a maximum allowed operating rectifier current at PRU i.

In some embodiments, the parameter values to be reported to PTU 102 may include values of a voltage ratio parameter. In various embodiments, for a PRU i, the voltage ratio $v_i$ may be defined according to Equation (7) as follows:

$$v_i = \frac{V_{RECT}}{V_{RECT\_HIGH}} \qquad (7)$$

where $V_{RECT}$ represents the DC voltage at the output of the rectifier of PRU i and $V_{RECT\_HIGH}$ represents a maximum operational $V_{RECT}$ at PRU i.

In some embodiments, the parameter values to be reported to PTU 102 may include values of a PRU power ratio parameter. In various embodiments, for a PRU i, the PRU power ratio $\alpha_i$ may be defined according to Equation (8) as follows:

$$\alpha_i = \frac{P_{RECT}}{P_{RECT\_MAX}} \qquad (8)$$

where $P_{RECT}$ represents the average power out of the rectifier of the PRU i, and $P_{RECT\_MAX}$ represents the maximum rated rectifier power for the PRU i.

In some embodiments, the parameter values to be reported to PTU 102 may include values of a PRU-PTU power ratio parameter. In various embodiments, for a PRU i, the PRU-PTU power ratio parameter $\eta_i$ may be defined according to Equations (9) and (10) as follows:

$$\eta_i = \frac{P_{RECT}}{P_{PTU}} \qquad (9)$$

$$P_{PTU} = V_{PTU\_COILS\_RMS} * I_{PTU\_COILS\_RMS} \qquad (10)$$

In some embodiments, each time PTU 102 identifies a dominant PRU, it may determine the dominant PRU based on a particular criterion. In various embodiments, each time PTU 102 identifies a dominant PRU, it may do so based on a same particular criterion. For example, in some embodiments, PTU 102 may perform each dominant PRU determination based on temperature ratio. In various embodiments in which PTU 102 uses the same criterion for each dominant PRU determination, PRUs may report values for a parameter corresponding to that criterion but not values for other parameters. For example, in an embodiment in which PTU 102 performs each dominant PRU determination based on voltage ratio, PRUs 104, 106, and 108 may report voltage ratio values to PTU 102 but may not report temperature ratio, current ratio, PRU power ratio, or PRU-PTU power ratio values to PTU 102. The embodiments are not limited to this example.

In some embodiments, the criterion that PTU 102 uses to determine a dominant PRU may comprise an optimal criterion selected from among multiple possible criteria corresponding to multiple respective parameters for which values are reported to PTU 102. For example, in various embodiments, PRUs 104, 106, and 108 may report temperature ratio, current ratio, voltage ratio, PRU power ratio, and PRU-PTU power ratio values to PTU 102, and PTU 102 may select the optimal criterion as one of temperature ratio, current ratio, voltage ratio, PRU power ratio, and PRU-PTU power ratio.

In some embodiments, PTU 102 may update its optimal criterion selection upon each charge session. In various embodiments, for example, during each charge session, PTU 102 may select one of temperature ratio, current ratio, voltage ratio, PRU power ratio, and PRU-PTU power ratio as the optimal criterion based on which to determine the dominant PRU during that charge session. In some embodiments, each time it updates its optimal criterion selection, PTU 102 may determine a dominant PRU i* according to Equation (11) as follows:

$$i^* = \mathrm{argmax}_i \gamma_i \tag{11}$$

where $\gamma_i$ can be $\tau_i$, $\sigma_i$, $v_i$, $\alpha_i$, or $\eta_i$ and may change from optimal criterion update to optimal criterion update.

In various embodiments, rather than updating its optimal criterion selection once per charge session, PTU 102 may update its optimal criterion selection according to other intervals/occurrences. In some embodiments, for example, PTU 102 may update its optimal criterion selection at periodic time intervals, such as every T seconds. In an example embodiment, T may be equal to 3 seconds. In various embodiments, PTU 102 may update its optimal criterion selection each time a new PRU is added to the system. In some embodiments, PTU 102 may determine whether to update its optimal criterion selection based on the value of $\gamma_i$. In various embodiments, for example, PTU 102 may forgo updating its optimal criterion selection when the value of $\gamma_i$ exceeds a defined threshold. In such embodiments, if the value of $\gamma_i$ falls below the defined threshold, PTU 102 may update its optimal criterion selection, and may continue periodically updating this selection while the value of $\gamma_i$ remains below the threshold. The embodiments are not limited in this context.

In some embodiments, for each PRU, PTU 102 may compare the values of the temperature ratio, current ratio, voltage ratio, PRU power ratio, and PRU-PTU power ratio parameters and may select the one with the highest value as the optimal criterion. In such embodiments, for a PRU i, the value of $\gamma_i$ may be given by Equation (12) as follows:

$$\gamma_i = \max(\tau_i, \sigma_i, v_i, \alpha_i, \eta_i) \tag{12}$$

In various embodiments, with respect to a given PRU, different weights may be assigned to different criteria depending on particular characteristics of that PRU. For example, with respect to a PRU that is particularly sensitive to temperature, a higher weight may be assigned to the value of its temperature ratio $\tau_i$. In some embodiments, such weights may differ from PRU to PRU and/or from criterion to criterion. In various embodiments, for a PRU i, a set of parameter values $\{\tau_i, \sigma_i, v_i, \alpha_i, \eta_i\}$ may be weighted according to a set of weights $\{c_{1,i}, c_{2,i}, c_{3,i}, c_{4,i}, c_{5,i}\}$. In such embodiments, for the PRU i, the value of $\gamma_i$ may be given by Equation (13) as follows:

$$\gamma_i = \max(\tau_i * c_{1,i}, \sigma_i * c_{2,i}, v_i * c_{3,i}, \alpha_i * c_{4,i}, \eta_i * c_{5,i}) \tag{13}$$

In some such embodiments, $c_{1,i}$, $c_{2,i}$, $c_{3,i}$, $c_{4,i}$ and $c_{5,i}$ may add up to 1. The embodiments are not limited in this context.

In various embodiments, with respect to a given PRU, the candidate criteria may be partitioned into two tiers. In some such embodiments, the candidate criteria may be partitioned into the two tiers based on factors such as the PRU category of the PRU, other characteristics of the PRU, and the relative importances of the candidate criteria. In various embodiments, the partitioning may be static. In some other embodiments, the partitioning may be dynamic, and may change over time. In various embodiments, if the highest parameter value among those corresponding to the higher tier criteria is greater than a threshold, the lower tier criteria may be ignored and the criteria corresponding to that highest parameter value may be selected as the optimal criterion. In some embodiments, if the highest parameter value among those corresponding to the higher tier criteria is less than the threshold, it may be compared to the highest parameter value among those corresponding to the lower tier criteria, and the larger of the two may be selected as the optimal criterion.

In an example embodiment, the higher tier may comprise temperature ratio, current ratio, and voltage ratio, and the lower tier may comprise PRU power ratio and PRU-PTU power ratio. The highest parameter value among those corresponding to the higher tier criteria, which may be denoted as $\theta_i$, may then be determined according to Equation (14) as follows:

$$\theta_i = \max(\tau_i, \sigma_i, v_i) \tag{14}$$

If $\theta_i$ is greater than a threshold Th that is equal to 0.8, then $\gamma_i$ may be determined to be equal to $\theta_i$. If $\theta_i$ is less than Th, then $\gamma_i$ may be determined according to Equation (15) as follows:

$$\gamma_i = \max(\theta_i, \alpha_i, \eta_i) \tag{15}$$

In various embodiments, normalized weights may be applied in conjunction with this two-tier approach. For example, if parameter values $\{\tau_i, \sigma_i, v_i, \alpha_i, \eta_i\}$ are weighted according to a set of weights $\{c_{1,i}, c_{2,i}, c_{3,i}, c_{4,i}, c_{5,i}\}$, then $\gamma_i$ may be determined according to Equations (16) and (17) as follows:

$$\theta_i = \max(\tau_i * c_{1,i}, \sigma_i * c_{2,i}, v_i * c_{3,i}) \tag{16}$$

$$\gamma_i = \begin{cases} \theta_i, & \theta_i > Th \\ \max(\theta_i, \alpha_i * c_{4,i}, \eta_i * c_{5,i}), & x \geq 0 \end{cases} \tag{17}$$

Figure 3:
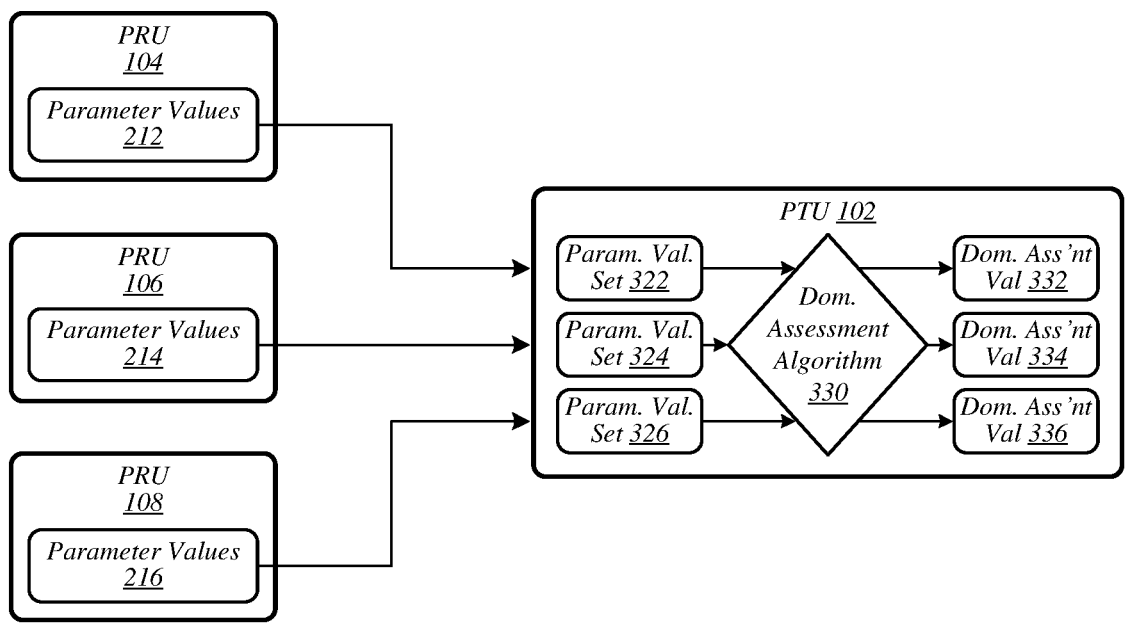
FIG. 3 illustrates an embodiment of a third operating environment.

FIG. 3 illustrates an example of an operating environment 300 that may be representative of the implementation of one or more of the disclosed resonator control techniques for wireless power transmitting units according to various embodiments. In operating environment 300, PTU 102 may generally be operative to identify one of PRUs 104, 106, and 108 as a dominant PRU by applying a dominance assessment algorithm 330. In various embodiments, PTU 102 may apply dominance assessment algorithm 330 to determine respective dominance assessment values 332, 334, and 336 for PRUs 104, 106, and 108. In some embodiments, PTU 102 may apply dominance assessment algorithm 330 to determine dominance assessment values 332, 334, and 336 based on respective parameter value sets 322, 324, and 326. In various embodiments, PTU 102 may identify one of PRUs 104, 106, and 108 as the dominant PRU based on dominance assessment values 332, 334, and 336. In some embodiments, PTU 102 may identify the largest value among dominance assessment values 332, 334, and 336, and may identify the PRU associated with that largest dominance assessment value as the dominant PRU, such as in accordance with Equation (11) above. For example, if dominance assessment value 332 is larger than both of dominance assessment values 334 and 336, PTU 102 may identify PRU 104 as the dominant PRU. It is worthy of note that in various embodiments, depending on the nature of dominance assessment algorithm 330 and/or the parameter values comprised in parameter value sets 322, 324, and 326, PTU 102 may identify the PRU associated with a smallest dominance assessment value as the dominant PRU. The embodiments are not limited in this context.

In operating environment 300, as in operating environment 200 of FIG. 2, PTU 102 may receive parameter values 212, 214, and 216 from PRUs 104, 106, and 108, respectively. In some embodiments, PTU 102 may determine parameter value sets 322, 324, and 326 based on parameter values 212, 214, and 216, respectively. In various embodiments, parameter value sets 322, 324, and 326 may comprise some or all of parameter values 212, 214, and 216, respectively. In some embodiments, the compositions of parameter value sets 322, 324, and 326 may depend in part on the particular algorithm that is used as dominance assessment algorithm 330. More particularly, in various embodiments, dominance assessment algorithm 330 may specify—among the parameters described by parameter values 212, 214, and 216—particular parameters to be considered in conjunction with identifying the dominant PRU, and parameter value sets 322, 324, and 326 may comprise values of those parameters. For example, if parameter values 212, 214, and 216 comprise respective temperature, current, and voltage ratios for PRUs 104, 106, and 108, and dominance assessment algorithm 330 specifies that the dominant PRU is to be identified based on consideration of temperature and current ratios, then parameter value sets 322, 324 and 326 may comprise the respective temperature and current ratios for PRUs 104, 106, and 108, but not their associated voltage ratios. The embodiments are not limited to this example.

In some embodiments, parameter value sets 322, 324, and 326 may include respective temperature ratio parameter values for PRUs 104, 106, and 108, such as may be determined in accordance with Equation (5) above. In various embodiments, parameter value sets 322, 324, and 326 may additionally or alternatively include respective current ratio parameter values for PRUs 104, 106, and 108, such as may be determined in accordance with Equation (6) above. In some embodiments, parameter value sets 322, 324, and 326 may additionally or alternatively include respective voltage ratio parameter values for PRUs 104, 106, and 108, such as may be determined in accordance with Equation (7) above. In various embodiments, parameter value sets 322, 324, and 326 may additionally or alternatively include respective PRU power ratio parameter values for PRUs 104, 106, and 108, such as may be determined in accordance with Equation (8) above. In some embodiments, parameter value sets 322, 324, and 326 may additionally or alternatively include respective PRU-PTU power ratio parameter values for PRUs 104, 106, and 108, such as may be determined in accordance with Equations (9) and (10) above. In various embodiments, parameter value sets 322, 324, and 326 may additionally or alternatively include values of one or more other types of parameters. The embodiments are not limited in this context.

In some embodiments, PTU 102 may be configured with the ability to select dominance assessment algorithm 330. In various embodiments, a given selection of dominance assessment algorithm 330 may apply during a particular time interval. For example, in some embodiments, PTU 102 may renew its selection of dominance assessment algorithm 330 every T seconds, such that a given selection of dominance assessment algorithm 330 applies for a duration of T seconds. In various such embodiments, T may be equal to 3. In some embodiments, PTU 102 may perform a renewed selection of dominance assessment algorithm 330 for each charge session. It is worthy of note that in both of the aforementioned scenarios, the renewed selection of dominance assessment algorithm 330 may or may not involve the selection of a different algorithm. The embodiments are not limited in this context.

In various embodiments, according to dominance assessment algorithm 330, parameter value sets 322, 324, and 326 may each comprise multiple parameter values, and dominance assessment values 332, 334, and 336 may be determined as the largest values comprised in parameter value sets 322, 324, and 326, respectively. For example, in some embodiments, parameter value sets 322, 324, and 326 may each include respective temperature ratio, current ratio, voltage ratio, PRU power ratio, and PRU-PTU power ratio parameter values, and dominance assessment values 332, 334, and 336 may be determined in accordance with Equation (12) above. The embodiments are not limited to this example.

In various embodiments, according to dominance assessment algorithm 330, dominance assessment values 332, 334, and 336 may be determined as maximum weighted values comprised in parameter value sets 322, 324, and 326, respectively. For example, in some embodiments, different weights may be applied to different values comprised in parameter value sets 322, 324, and 326, and dominance assessment values 332, 334, and 336 may be identified as the maximum values yielded by such weighting, such as in accordance with Equation (13) above. In various embodiments, a same set of weights may be applied to each of parameter value sets 322, 324, and 326. In some other embodiments, the applied sets of weights may differ among parameter value sets 322, 324, and 326. In various such embodiments, according to dominance assessment algorithm 330, the particular set of weights that is applied to the parameter value set corresponding to a given PRU may be selected based on particular characteristics of that PRU. For example, if PRU 104 is especially sensitive to temperature and parameter value set 322 includes a value of a temperature ratio parameter for PRU 104, that temperature ratio parameter value may be weighted more heavily than temperature ratio parameter values comprised in parameter value sets 324 and 326. The embodiments are not limited to this example.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 4:
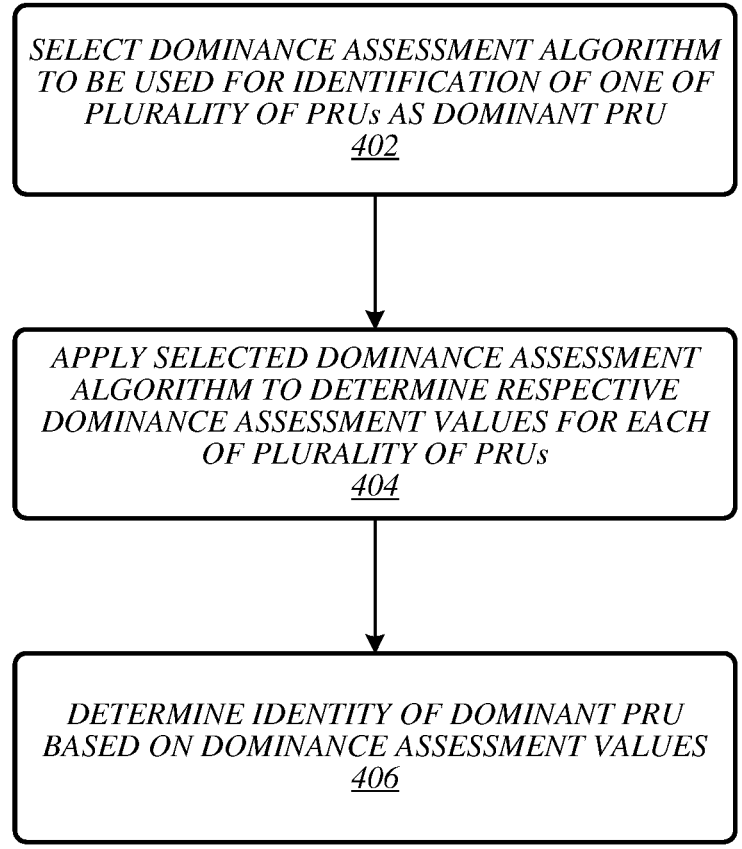
FIG. 4 illustrates an embodiment of a first logic flow.

FIG. 4 illustrates an example of a logic flow 400 that may be representative of the implementation of one or more of the disclosed resonator control techniques according to some embodiments. As shown in FIG. 4, a dominance assessment algorithm may be selected at 402 for use to identify one of a plurality of PRUs as a dominant PRU. For example, in operating environment 300 of FIG. 3, PTU 102 may select dominance assessment algorithm 330. At 404, the selected dominance assessment algorithm may be applied to determine respective dominance assessment values for each of a plurality of PRUs. For example, in operating environment 300 of FIG. 3, PTU 102 may apply dominance assessment algorithm 330 to determine dominance assessment values 332, 334, and 336 based on respective parameter value sets 322, 324, and 326. At 406, an identity of the dominant PRU may be determined based on the dominance assessment values. For example, in operating environment 300 of FIG. 3, PTU 102 may be operative to identify one of PRUs 104, 106, and 108 as a dominant PRU based on dominance assessment values 332, 334, and 336. The embodiments are not limited to these examples.

Figure 5:
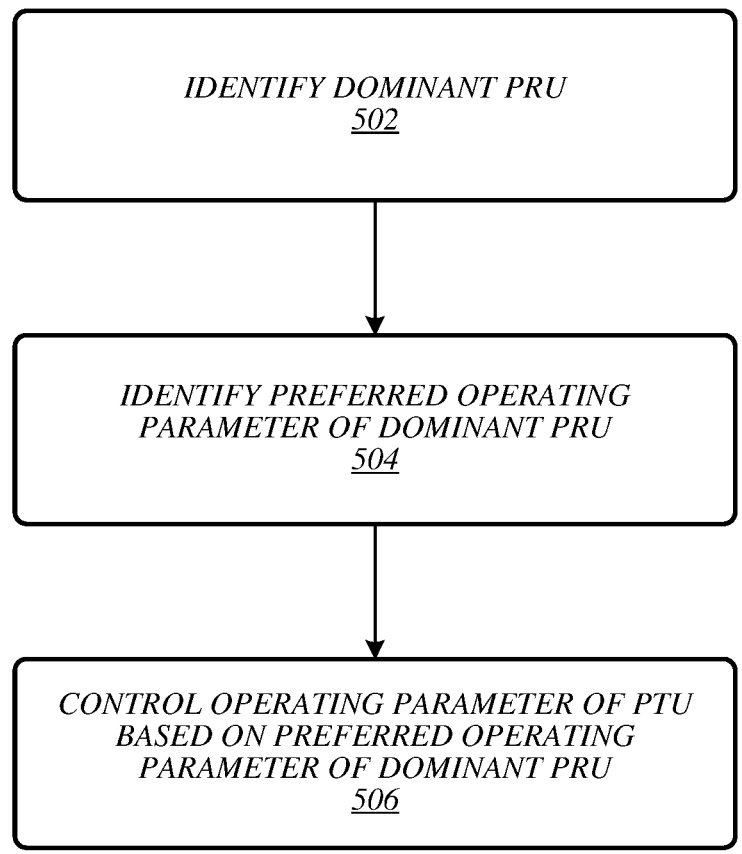
FIG. 5 illustrates an embodiment of a second logic flow.

FIG. 5 illustrates an example of a logic flow 500 that may be representative of the implementation of one or more of the disclosed resonator control techniques according to various embodiments. As shown in FIG. 5, a dominant PRU may be identified at 502. For example, in operating environment 300 of FIG. 3, PTU 102 may be operative to identify one of PRUs 104, 106, and 108 as a dominant PRU. At 504, a preferred operating parameter of the dominant PRU may be identified. For example, in operating environment 300 of FIG. 3, after identifying a dominant PRU, PTU 102 may be operative to identify a preferred rectifier voltage of the dominant PRU. At 506, an operating parameter of a PTU may be controlled based on the preferred operating parameter of the dominant PRU. For example, in operating environment 300 of FIG. 3, PTU 102 may control its resonator coil current to minimize a difference between the preferred rectifier voltage of the dominant PRU and the actual rectifier voltage of the dominant PRU. The embodiments are not limited to these examples.

Various embodiments of the invention may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc. The embodiments are not limited in this context.

Figure 6:
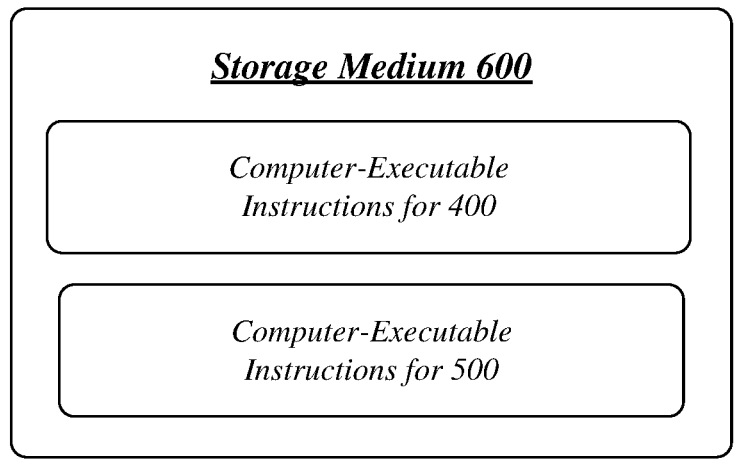
FIG. 6 illustrates an embodiment of a first storage medium.

FIG. 6 illustrates an embodiment of a storage medium 600. Storage medium 600 may comprise any non-transitory computer-readable storage medium or machine-readable storage medium, such as an optical, magnetic or semiconductor storage medium. In various embodiments, storage medium 600 may comprise an article of manufacture. In some embodiments, storage medium 600 may store computer-executable instructions, such as computer-executable instructions to implement one or both of logic flow 400 of FIG. 4 and logic flow 500 of FIG. 5. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

FIG. 7 illustrates an embodiment of a storage medium 700. Storage medium 700 may comprise any non-transitory computer-readable storage medium or machine-readable storage medium, such as an optical, magnetic or semiconductor storage medium. In various embodiments, storage medium 700 may comprise an article of manufacture. In some embodiments, storage medium 700 may store computer-executable instructions. In various embodiments, such computer-executable instructions may include computer-executable instructions to implement wireless charging station 101 and/or PTU 102. In some embodiments, such computer-executable instructions may include computer-executable instructions to implement a WCD such as WCD 103, 105, or 107 and/or to implement a PRU such as PRU 104, 106, or 108. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 8:
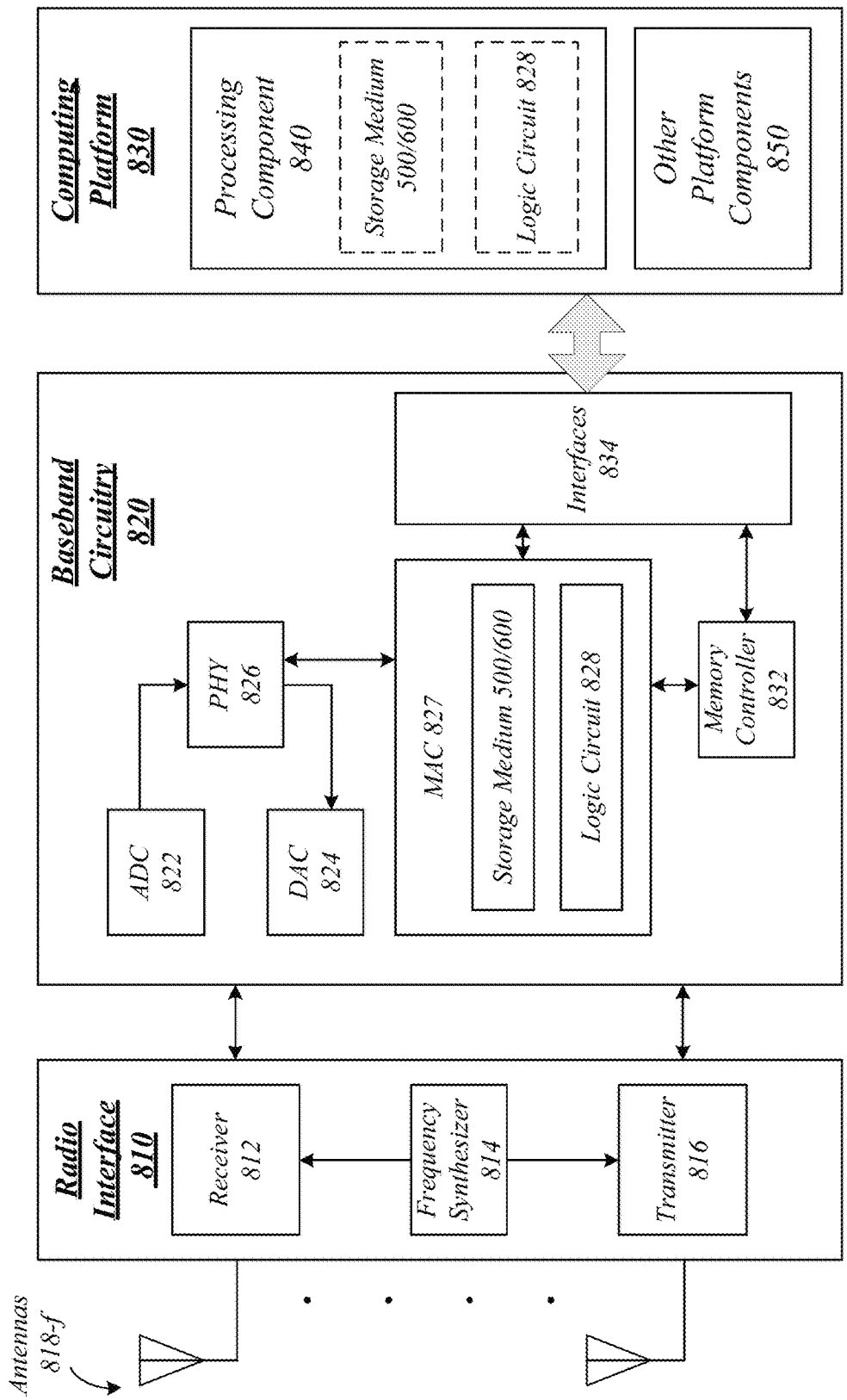
FIG. 8 illustrates an embodiment of a device.

FIG. 8 illustrates an embodiment of a communications device 800 that may implement one or more of wireless charging station 101, PTU 102, WCDs 103, 105, and 107, PRUs 104, 106, and 108, logic flow 400, logic flow 500, storage medium 600, and storage medium 700. In various embodiments, device 800 may comprise a logic circuit 828. The logic circuit 828 may include physical circuits to perform operations described for one or more of wireless charging station 101, PTU 102, WCDs 103, 105, and 107, PRUs 104, 106, and 108, logic flow 400, and logic flow 500, for example. As shown in FIG. 8, device 800 may include a radio interface 810, baseband circuitry 820, and computing platform 830, although the embodiments are not limited to this configuration.

The device 800 may implement some or all of the structure and/or operations for one or more of wireless charging station 101, PTU 102, WCDs 103, 105, and 107, PRUs 104, 106, and 108, logic flow 400, logic flow 500, storage medium 600, storage medium 700, and logic circuit 828 in a single computing entity, such as entirely within a single device. Alternatively, the device 800 may distribute portions of the structure and/or operations for one or more of wireless charging station 101, PTU 102, WCDs 103, 105, and 107, PRUs 104, 106, and 108, logic flow 400, logic flow 500, storage medium 600, storage medium 700, and logic circuit 828 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 810 may include a component or combination of components adapted for transmitting and/or receiving single-carrier or multi-carrier modulated signals (e.g., including complementary code keying (CCK), orthogonal frequency division multiplexing (OFDM), and/or single-carrier frequency division multiple access (SC-FDMA) symbols) although the embodiments are not limited to any specific over-the-air interface or modulation scheme. Radio interface 810 may include, for example, a receiver 812, a frequency synthesizer 814, and/or a transmitter 816. Radio interface 810 may include bias controls, a crystal oscillator and/or one or more antennas 818-*f*. In another embodiment, radio interface 810 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 820 may communicate with radio interface 810 to process receive and/or transmit signals and may include, for example, an analog-to-digital converter 822 for down converting received signals, a digital-to-analog converter 824 for up converting signals for transmission. Further, baseband circuitry 820 may include a baseband or physical layer (PHY) processing circuit 826 for PHY link layer processing of respective receive/transmit signals. Baseband circuitry 820 may include, for example, a medium access control (MAC) processing circuit 827 for MAC/data link layer processing. Baseband circuitry 820 may include a memory controller 832 for communicating with MAC processing circuit 827 and/or a computing platform 830, for example, via one or more interfaces 834.

In some embodiments, PHY processing circuit 826 may include a frame construction and/or detection module, in combination with additional circuitry such as a buffer memory, to construct and/or deconstruct communication frames. Alternatively or in addition, MAC processing circuit 827 may share processing for certain of these functions or perform these processes independent of PHY processing circuit 826. In some embodiments, MAC and PHY processing may be integrated into a single circuit.

The computing platform 830 may provide computing functionality for the device 800. As shown, the computing platform 830 may include a processing component 840. In addition to, or alternatively of, the baseband circuitry 820, the device 800 may execute processing operations or logic for one or more of wireless charging station 101, PTU 102, WCDs 103, 105, and 107, PRUs 104, 106, and 108, logic flow 400, logic flow 500, storage medium 600, storage medium 700, and logic circuit 828 using the processing component 840. The processing component 840 (and/or PHY 826 and/or MAC 827) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 830 may further include other platform components 850. Other platform components 850 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 800 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, display, television, digital television, set top box, wireless access point, base station, node B, subscriber station, mobile subscriber center, radio network controller, router, hub, gateway, bridge, switch, machine, or combination thereof. Accordingly, functions and/or specific configurations of device 800 described herein, may be included or omitted in various embodiments of device 800, as suitably desired.

Embodiments of device 800 may be implemented using single input single output (SISO) architectures. However, certain implementations may include multiple antennas (e.g., antennas 818-f) for transmission and/or reception using adaptive antenna techniques for beamforming or spatial division multiple access (SDMA) and/or using MIMO communication techniques.

The components and features of device 800 may be implemented using any combination of discrete circuitry, application specific integrated circuits (ASICs), logic gates and/or single chip architectures. Further, the features of device 800 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 800 shown in the block diagram of FIG. 8 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Figure 9:
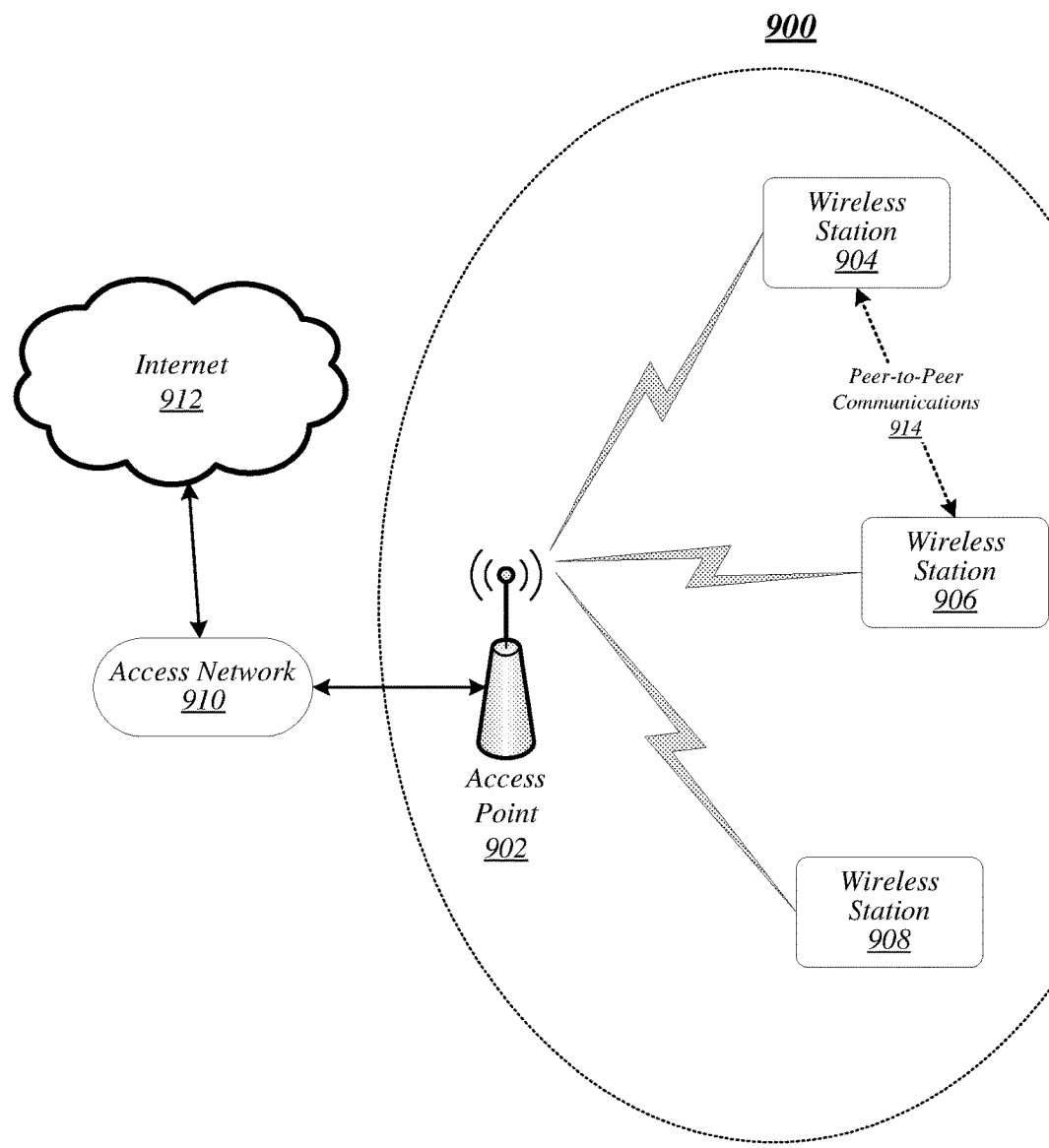
FIG. 9 illustrates an embodiment of a wireless network.

FIG. 9 illustrates an embodiment of a wireless network 900. As shown in FIG. 9, wireless network comprises an access point 902 and wireless stations 904, 906, and 908. In various embodiments, wireless network 900 may comprise a wireless local area network (WLAN), such as a WLAN implementing one or more Institute of Electrical and Electronics Engineers (IEEE) 802.11 standards (sometimes collectively referred to as "Wi-Fi"). In some other embodiments, wireless network 900 may comprise another type of wireless network, and/or may implement other wireless communications standards. In various embodiments, for example, wireless network 900 may comprise a WWAN or WPAN rather than a WLAN. The embodiments are not limited to this example.

In some embodiments, wireless network 900 may implement one or more broadband wireless communications standards, such as 3G or 4G standards, including their revisions, progeny, and variants. Examples of 3G or 4G wireless standards may include without limitation any of the IEEE 802.16m and 802.16p standards, 3rd Generation Partnership Project (3GPP) Long Term Evolution (LTE) and LTE-Advanced (LTE-A) standards, and International Mobile Telecommunications Advanced (IMT-ADV) standards, including their revisions, progeny and variants. Other suitable examples may include, without limitation, Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1xRTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, 3GPP Rel. 8-12 of LTE/System Architecture Evolution (SAE), and so forth. The embodiments are not limited in this context.

In various embodiments, wireless stations 904, 906, and 908 may communicate with access point 902 in order to obtain connectivity to one or more external data networks. In some embodiments, for example, wireless stations 904, 906, and 908 may connect to the Internet 912 via access point 902 and access network 910. In various embodiments, access network 910 may comprise a private network that provides subscription-based Internet-connectivity, such as an Internet Service Provider (ISP) network. The embodiments are not limited to this example.

In various embodiments, two or more of wireless stations 904, 906, and 908 may communicate with each other directly by exchanging peer-to-peer communications. For example, in the example of FIG. 9, wireless stations 904 and 906 communicate with each other directly by exchanging peer-to-peer communications 914. In some embodiments, such peer-to-peer communications may be performed according to one or more Wi-Fi Alliance (WFA) standards. For example, in various embodiments, such peer-to-peer communications may be performed according to the WFA Wi-Fi Direct standard, 2010 Release. In various embodiments, such peer-to-peer communications may additionally or alternatively be performed using one or more interfaces, protocols, and/or standards developed by the WFA Wi-Fi Direct Services (WFDS) Task Group. The embodiments are not limited to these examples.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments:

Example 1 is an apparatus, comprising a memory, and logic for a power transmitting unit (PTU), at least a portion of the logic implemented in circuitry coupled to the memory, the logic to select a dominance assessment algorithm to be used for identification of one of a plurality of power receiving units (PRUs) as a dominant PRU, identify a plurality of parameter values sets, each parameter value set to correspond to a respective one of the plurality of PRUs, apply the selected dominance assessment algorithm to determine a plurality of dominance assessment values, each dominance assessment value to be determined based on a respective one of the plurality of parameter value sets, and identify the dominant PRU based on the plurality of dominance assessment values.

Example 2 is the apparatus of Example 1, each parameter value set to include a temperature ratio parameter value for its corresponding PRU.

Example 3 is the apparatus of any of Examples 1 to 2, each parameter value set to include a current ratio parameter value for its corresponding PRU.

Example 4 is the apparatus of any of Examples 1 to 3, each parameter value set to include a voltage ratio parameter value for its corresponding PRU.

Example 5 is the apparatus of any of Examples 1 to 4, each parameter value set to include a PRU power ratio parameter value for its corresponding PRU.

Example 6 is the apparatus of any of Examples 1 to 5, each parameter value set to include a PRU-PTU power ratio parameter for its corresponding PRU.

Example 7 is the apparatus of any of Examples 1 to 6, each dominance assessment value to comprise a parameter value included among one or more parameter values comprised in a respective one of the plurality of parameter values sets.

Example 8 is the apparatus of any of Examples 1 to 7, each dominance assessment value to comprise a largest parameter value of a respective one of the plurality of parameter value sets.

Example 9 is the apparatus of any of Examples 1 to 8, each parameter value set to comprise a single parameter value, each dominance assessment value to comprise the single parameter value in a respective one of the plurality of parameter value sets.

Example 10 is the apparatus of any of Examples 1 to 6, each dominance assessment value to comprise a weighted maximum parameter value of a respective one of the plurality of parameter value sets.

Example 11 is the apparatus of any of Examples 1 to 10, the logic to select the dominance assessment algorithm in response to a detection of a new PRU in a charge area of the PTU.

Example 12 is the apparatus of any of Examples 1 to 10, the logic to apply the selected dominance assessment algorithm during a first charge session, and select a second dominance assessment algorithm for application during a second charge session.

Example 13 is the apparatus of any of Examples 1 to 10, the logic to apply the selected dominance assessment during a first time interval, and select a second dominance assessment algorithm for application during a second time interval.

Example 14 is the apparatus of Example 13, the first and second time intervals to comprise durations of 3 seconds.

Example 15 is the apparatus of any of Examples 1 to 14, the logic to identify a preferred value for an operating parameter of the dominant PRU, and control an operating parameter of the PTU based on the preferred value for the operating parameter of the dominant PRU.

Example 16 is the apparatus of Example 15, the controlled operating parameter to comprise a resonator coil current of the PTU.

Example 17 is the apparatus of any of Examples 15 to 16, the operating parameter of the dominant PRU to comprise a rectifier voltage of the dominant PRU.

Example 18 is the apparatus of any of Examples 15 to 17, the logic to control the operating parameter of the PTU to minimize a difference between a realized value of the operating parameter of the dominant PRU and the preferred value for the operating parameter of the dominant PRU.

Example 19 is a system, comprising an apparatus according to any of Examples 1 to 18, and at least one radio frequency (RF) transceiver.

Example 20 is the system of Example 19, comprising at least one RF antenna.

Example 21 is the system of any of Examples 19 to 20, comprising at least one processor.

Example 22 is at least one non-transitory computer-readable storage medium comprising a set of instructions that, in response to being executed at a power transmitting unit (PTU), cause the PTU to select a dominance assessment algorithm to be used for identification of one of a plurality of power receiving units (PRUs) as a dominant PRU, identify a plurality of parameter values sets, each parameter value set to correspond to a respective one of the plurality of PRUs, apply the selected dominance assessment algorithm to determine a plurality of dominance assessment values, each dominance assessment value to be determined based on a respective one of the plurality of parameter value sets, and identify the dominant PRU based on the plurality of dominance assessment values.

Example 23 is the at least one non-transitory computer-readable storage medium of Example 22, each parameter value set to include a temperature ratio parameter value for its corresponding PRU.

Example 24 is the at least one non-transitory computer-readable storage medium of any of Examples 22 to 23, each parameter value set to include a current ratio parameter value for its corresponding PRU.

Example 25 is the at least one non-transitory computer-readable storage medium of any of Examples 22 to 24, each parameter value set to include a voltage ratio parameter value for its corresponding PRU.

Example 26 is the at least one non-transitory computer-readable storage medium of any of Examples 22 to 25, each parameter value set to include a PRU power ratio parameter value for its corresponding PRU.

Example 27 is the at least one non-transitory computer-readable storage medium of any of Examples 22 to 26, each parameter value set to include a PRU-PTU power ratio parameter for its corresponding PRU.

Example 28 is the at least one non-transitory computer-readable storage medium of any of Examples 22 to 27, each dominance assessment value to comprise a parameter value included among one or more parameter values comprised in a respective one of the plurality of parameter values sets.

Example 29 is the at least one non-transitory computer-readable storage medium of any of Examples 22 to 28, each dominance assessment value to comprise a largest parameter value of a respective one of the plurality of parameter value sets.

Example 30 is the at least one non-transitory computer-readable storage medium of any of Examples 22 to 29, each parameter value set to comprise a single parameter value, each dominance assessment value to comprise the single parameter value in a respective one of the plurality of parameter value sets.

Example 31 is the at least one non-transitory computer-readable storage medium of any of Examples 22 to 27, each dominance assessment value to comprise a weighted maximum parameter value of a respective one of the plurality of parameter value sets.

Example 32 is the at least one non-transitory computer-readable storage medium of any of Examples 22 to 31, comprising instructions that, in response to being executed at the PTU, cause the PTU to select the dominance assessment algorithm in response to a detection of a new PRU in a charge area of the PTU.

Example 33 is the at least one non-transitory computer-readable storage medium of any of Examples 22 to 31, comprising instructions that, in response to being executed at the PTU, cause the PTU to apply the selected dominance assessment algorithm during a first charge session, and select a second dominance assessment algorithm for application during a second charge session.

Example 34 is the at least one non-transitory computer-readable storage medium of any of Examples 22 to 31, comprising instructions that, in response to being executed at the PTU, cause the PTU to apply the selected dominance assessment during a first time interval, and select a second dominance assessment algorithm for application during a second time interval.

Example 35 is the at least one non-transitory computer-readable storage medium of Example 34, the first and second time intervals to comprise durations of 3 seconds.

Example 36 is the at least one non-transitory computer-readable storage medium of any of Examples 22 to 35, comprising instructions that, in response to being executed at the PTU, cause the PTU to identify a preferred value for an operating parameter of the dominant PRU, and control an operating parameter of the PTU based on the preferred value for the operating parameter of the dominant PRU.

Example 37 is the at least one non-transitory computer-readable storage medium of Example 36, the controlled operating parameter to comprise a resonator coil current of the PTU.

Example 38 is the at least one non-transitory computer-readable storage medium of any of Examples 36 to 37, the operating parameter of the dominant PRU to comprise a rectifier voltage of the dominant PRU.

Example 39 is the at least one non-transitory computer-readable storage medium of any of Examples 36 to 38, comprising instructions that, in response to being executed at the PTU, cause the PTU to control the operating parameter of the PTU to minimize a difference between a realized value of the operating parameter of the dominant PRU and the preferred value for the operating parameter of the dominant PRU.

Example 40 is a method, comprising selecting, by circuitry of a power transmitting unit (PTU), a dominance assessment algorithm to be used for identification of one of a plurality of power receiving units (PRUs) as a dominant PRU, identifying a plurality of parameter values sets, each parameter value set to correspond to a respective one of the plurality of PRUs, applying the selected dominance assessment algorithm to determine a plurality of dominance assessment values, each dominance assessment value to be determined based on a respective one of the plurality of parameter value sets, and identifying the dominant PRU based on the plurality of dominance assessment values.

Example 41 is the method of Example 40, each parameter value set to include a temperature ratio parameter value for its corresponding PRU.

Example 42 is the method of any of Examples 40 to 41, each parameter value set to include a current ratio parameter value for its corresponding PRU.

Example 43 is the method of any of Examples 40 to 42, each parameter value set to include a voltage ratio parameter value for its corresponding PRU.

Example 44 is the method of any of Examples 40 to 43, each parameter value set to include a PRU power ratio parameter value for its corresponding PRU.

Example 45 is the method of any of Examples 40 to 44, each parameter value set to include a PRU-PTU power ratio parameter for its corresponding PRU.

Example 46 is the method of any of Examples 40 to 45, each dominance assessment value to comprise a parameter value included among one or more parameter values comprised in a respective one of the plurality of parameter values sets.

Example 47 is the method of any of Examples 40 to 46, each dominance assessment value to comprise a largest parameter value of a respective one of the plurality of parameter value sets.

Example 48 is the method of any of Examples 40 to 47, each parameter value set to comprise a single parameter value, each dominance assessment value to comprise the single parameter value in a respective one of the plurality of parameter value sets.

Example 49 is the method of any of Examples 40 to 45, each dominance assessment value to comprise a weighted maximum parameter value of a respective one of the plurality of parameter value sets.

Example 50 is the method of any of Examples 40 to 49, comprising selecting the dominance assessment algorithm in response to a detection of a new PRU in a charge area of the PTU.

Example 51 is the method of any of Examples 40 to 49, comprising applying the selected dominance assessment algorithm during a first charge session, and selecting a second dominance assessment algorithm for application during a second charge session.

Example 52 is the method of any of Examples 40 to 49, comprising applying the selected dominance assessment during a first time interval, and selecting a second dominance assessment algorithm for application during a second time interval.

Example 53 is the method of Example 52, the first and second time intervals to comprise durations of 3 seconds.

Example 54 is the method of any of Examples 40 to 53, comprising identifying a preferred value for an operating parameter of the dominant PRU, and controlling an operating parameter of the PTU based on the preferred value for the operating parameter of the dominant PRU.

Example 55 is the method of Example 54, the controlled operating parameter to comprise a resonator coil current of the PTU.

Example 56 is the method of any of Examples 54 to 55, the operating parameter of the dominant PRU to comprise a rectifier voltage of the dominant PRU.

Example 57 is the method of any of Examples 54 to 56, comprising controlling the operating parameter of the PTU to minimize a difference between a realized value of the operating parameter of the dominant PRU and the preferred value for the operating parameter of the dominant PRU.

Example 58 is at least one non-transitory computer-readable storage medium comprising a set of instructions that, in response to being executed on a computing device, cause the computing device to perform a method according to any of Examples 40 to 57.

Example 59 is an apparatus, comprising means for performing a method according to any of Examples 40 to 57.

Example 60 is a system, comprising the apparatus of Example 59, and at least one radio frequency (RF) transceiver.

Example 61 is the system of Example 60, comprising at least one RF antenna.

Example 62 is the system of any of Examples 60 to 61, comprising at least one processor.

Example 63 is an apparatus, comprising means for selecting a dominance assessment algorithm to be used by a power transmitting unit (PTU) for identification of one of a plurality of power receiving units (PRUs) as a dominant PRU, means for identifying a plurality of parameter values sets, each parameter value set to correspond to a respective one of the plurality of PRUs, means for applying the selected dominance assessment algorithm to determine a plurality of dominance assessment values, each dominance assessment value to be determined based on a respective one of the plurality of parameter value sets, and means for identifying the dominant PRU based on the plurality of dominance assessment values.

Example 64 is the apparatus of Example 63, each parameter value set to include a temperature ratio parameter value for its corresponding PRU.

Example 65 is the apparatus of any of Examples 63 to 64, each parameter value set to include a current ratio parameter value for its corresponding PRU.

Example 66 is the apparatus of any of Examples 63 to 65, each parameter value set to include a voltage ratio parameter value for its corresponding PRU.

Example 67 is the apparatus of any of Examples 63 to 66, each parameter value set to include a PRU power ratio parameter value for its corresponding PRU.

Example 68 is the apparatus of any of Examples 63 to 67, each parameter value set to include a PRU-PTU power ratio parameter for its corresponding PRU.

Example 69 is the apparatus of any of Examples 63 to 68, each dominance assessment value to comprise a parameter value included among one or more parameter values comprised in a respective one of the plurality of parameter values sets.

Example 70 is the apparatus of any of Examples 63 to 69, each dominance assessment value to comprise a largest parameter value of a respective one of the plurality of parameter value sets.

Example 71 is the apparatus of any of Examples 63 to 70, each parameter value set to comprise a single parameter value, each dominance assessment value to comprise the single parameter value in a respective one of the plurality of parameter value sets.

Example 72 is the apparatus of any of Examples 63 to 68, each dominance assessment value to comprise a weighted maximum parameter value of a respective one of the plurality of parameter value sets.

Example 73 is the apparatus of any of Examples 63 to 72, comprising selecting the dominance assessment algorithm in response to a detection of a new PRU in a charge area of the PTU.

Example 74 is the apparatus of any of Examples 63 to 72, comprising means for applying the selected dominance assessment algorithm during a first charge session, and means for selecting a second dominance assessment algorithm for application during a second charge session.

Example 75 is the apparatus of any of Examples 63 to 72, comprising means for applying the selected dominance assessment during a first time interval, and means for selecting a second dominance assessment algorithm for application during a second time interval.

Example 76 is the apparatus of Example 75, the first and second time intervals to comprise durations of 3 seconds.

Example 77 is the apparatus of any of Examples 63 to 76, comprising means for identifying a preferred value for an operating parameter of the dominant PRU, and means for controlling an operating parameter of the PTU based on the preferred value for the operating parameter of the dominant PRU.

Example 78 is the apparatus of Example 77, the controlled operating parameter to comprise a resonator coil current of the PTU.

Example 79 is the apparatus of any of Examples 77 to 78, the operating parameter of the dominant PRU to comprise a rectifier voltage of the dominant PRU.

Example 80 is the apparatus of any of Examples 77 to 79, comprising means for controlling the operating parameter of the PTU to minimize a difference between a realized value of the operating parameter of the dominant PRU and the preferred value for the operating parameter of the dominant PRU.

Example 81 is a system, comprising an apparatus according to any of Examples 63 to 80, and at least one radio frequency (RF) transceiver.

Example 82 is the system of Example 81, comprising at least one RF antenna.

Example 83 is the system of any of Examples 81 to 82, comprising at least one processor.

Example 84 is the apparatus of any of Examples 1 to 18, the logic to identify the dominant PRU as a PRU associated with a largest one of the plurality of dominance assessment values.

Example 85 is the apparatus of any of Examples 1 to 18, the logic to identify the dominant PRU as a PRU associated with a smallest one of the plurality of dominance assessment values.

Example 86 is a system, comprising an apparatus according to any of Examples 84 to 85, and at least one radio frequency (RF) transceiver.

Example 87 is the system of Example 86, comprising at least one RF antenna.

Example 88 is the system of any of Examples 86 to 87, comprising at least one processor.

Example 89 is the at least one non-transitory computer-readable storage medium of any of Examples 22 to 39, comprising instructions that, in response to being executed at the PTU, cause the PTU to identify the dominant PRU as a PRU associated with a largest one of the plurality of dominance assessment values.

Example 90 is the at least one non-transitory computer-readable storage medium of any of Examples 22 to 39, comprising instructions that, in response to being executed at the PTU, cause the PTU to identify the dominant PRU as a PRU associated with a smallest one of the plurality of dominance assessment values.

Example 91 is the method of any of Examples 40 to 57, comprising identifying the dominant PRU as a PRU associated with a largest one of the plurality of dominance assessment values.

Example 92 is the method of any of Examples 40 to 57, comprising identifying the dominant PRU as a PRU associated with a smallest one of the plurality of dominance assessment values.

Example 93 is at least one non-transitory computer-readable storage medium comprising a set of instructions that, in response to being executed on a computing device, cause the computing device to perform a method according to any of Examples 91 to 92.

Example 94 is an apparatus, comprising means for performing a method according to any of Examples 91 to 92.

Example 95 is a system, comprising the apparatus of Example 94, and at least one radio frequency (RF) transceiver.

Example 96 is the system of Example 95, comprising at least one RF antenna.

Example 97 is the system of any of Examples 95 to 96, comprising at least one processor.

Example 98 is the apparatus of any of Examples 63 to 80, the dominant PRU to be identified as a PRU associated with a largest one of the plurality of dominance assessment values.

Example 99 is the apparatus of any of Examples 63 to 80, the dominant PRU to be identified as a PRU associated with a smallest one of the plurality of dominance assessment values.

Example 100 is a system, comprising an apparatus according to any of Examples 98 to 99, and at least one radio frequency (RF) transceiver.

Example 101 is the system of Example 100, comprising at least one RF antenna.

Example 102 is the system of any of Examples 100 to 101, comprising at least one processor.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
  a memory; and
  logic for a power transmitting unit (PTU), at least a portion of the logic implemented in circuitry coupled to the memory, the logic to:
    determine a respective value of a dominant power receiving unit (PRU) selection parameter for each of a plurality of PRUs;
    identify one of the plurality of PRUs as a dominant PRU of the PTU for simultaneous power transfer to the plurality of PRUs based on a dominant PRU selection parameter value associated with that one of the plurality of PRUs; and
    transmit power to the plurality of PRUs simultaneously via control of a resonator coil current of a resonator coil of the PTU to minimize a difference between a direct current (DC) voltage at an output of a rectifier of the dominant PRU and a preferred rectifier output voltage of the dominant PRU.

2. The apparatus of claim 1, the dominant PRU selection parameter to comprise a power ratio.

3. The apparatus of claim 2, the power ratio to comprise a ratio between an average rectifier output power parameter and a maximum rated rectifier output power parameter.

4. The apparatus of claim 1, the dominant PRU selection parameter to comprise a temperature ratio.

5. The apparatus of claim 1, the dominant PRU selection parameter to comprise a voltage ratio.

6. The apparatus of claim 5, the voltage ratio to comprise a ratio between a rectifier output voltage parameter and a maximum operational rectifier output voltage parameter.

7. The apparatus of claim 5, the voltage ratio to comprise a ratio between a rectifier output voltage parameter and a minimum operational rectifier output voltage parameter.

8. The apparatus of claim 1, comprising at least one radio frequency (RF) transceiver.

9. At least one computer-readable, non-transitory storage medium comprising a set of instructions that, in response to being executed at a power transmitting unit (PTU), cause the PTU to:
  select an algorithm for determining a dominant power receiving unit (PRU) of a plurality of PRUs of the PTU for simultaneous power transfer to the plurality of PRUs;
  apply the selected algorithm to identify one of a plurality of PRUs as the dominant PRU of the PTU for simultaneous power transfer to the plurality of PRUs; and
  transmit power to the plurality of PRUs simultaneously via control of a resonator coil current of a resonator coil of the PTU to minimize a difference between a direct current (DC) voltage at an output of a rectifier of the dominant PRU and a preferred rectifier output voltage of the dominant PRU.

10. The at least one computer-readable storage medium of claim 9, the selected algorithm to designate a power ratio parameter as a criterion for dominant PRU selection.

11. The at least one computer-readable storage medium of claim 10, the power ratio parameter to comprise a ratio between an average rectifier output power parameter and a maximum rated rectifier output power parameter.

12. The at least one computer-readable storage medium of claim 9, the selected algorithm to designate a temperature ratio parameter as a criterion for dominant PRU selection.

13. The at least one computer-readable storage medium of claim 9, the selected algorithm to designate a voltage ratio parameter as a criterion for dominant PRU selection.

14. The at least one computer-readable storage medium of claim 13, the voltage ratio parameter to comprise a ratio between a rectifier output voltage parameter and a maximum operational rectifier output voltage parameter.

15. The at least one computer-readable storage medium of claim 13, the voltage ratio parameter to comprise a ratio between a rectifier output voltage parameter and a minimum operational rectifier output voltage parameter.

16. A power transmitting unit (PTU), comprising:
  a resonator;
  a radio; and
  logic, at least a portion of which is implemented in circuitry coupled to the resonator and the radio, the logic to:
    select a parameter for use as a criterion for dominant power receiving unit (PRU) identification;
    determine an identity of a dominant PRU of a plurality of PRUs of the PTU for simultaneous power transfer to the plurality of PRUs based on the selected parameter; and
    transmit power to the plurality of PRUs simultaneously via control of a resonator coil current of the resonator coil of the PTU to minimize a difference between a direct current (DC) voltage at an output of a rectifier of the dominant PRU and a preferred rectifier output voltage of the dominant PRU.

17. The PTU of claim 16, the selected parameter to comprise a power ratio parameter.

18. The PTU of claim 17, the power ratio parameter to comprise a ratio between an average rectifier output power parameter and a maximum rated rectifier output power parameter.

19. The PTU of claim 16, the selected parameter to comprise a temperature ratio parameter.

20. The PTU of claim 16, the selected parameter to comprise a voltage ratio parameter.

21. The PTU of claim 20, the voltage ratio parameter to comprise a ratio between a rectifier output voltage parameter and a maximum operational rectifier output voltage parameter.

22. The PTU of claim 20, the voltage ratio parameter to comprise a ratio between a rectifier output voltage parameter and a minimum operational rectifier output voltage parameter.

23. An apparatus, comprising:
  the PTU of claim 16; and
  at least one radio frequency (RF) antenna coupled to the radio.

* * * * *